United States Patent [19]

Kersting et al.

[11] 4,425,925
[45] Jan. 17, 1984

[54] HARVESTER THRESHER

[75] Inventors: Hermann Kersting, Oelde; Heinrich Roderfeld, Harsewinkel, both of Fed. Rep. of Germany

[73] Assignee: Claas OHG, Harsewinkel, Fed. Rep. of Germany

[21] Appl. No.: 364,666

[22] Filed: Apr. 2, 1982

[30] Foreign Application Priority Data

Apr. 9, 1981 [DE] Fed. Rep. of Germany ....... 3114382

[51] Int. Cl.³ .............................................. A01F 12/44
[52] U.S. Cl. ................................ 130/22 A; 130/27 P; 130/27 S
[58] Field of Search ................... 130/27 P, 27 S, 27 Q, 130/27 R, 22 A, 30 R, 23, 24, 26, 27 L; 56/14.6

[56] References Cited

U.S. PATENT DOCUMENTS

| 2,931,363 | 4/1960 | Bulin | 130/27 S |
| 4,165,751 | 8/1979 | Todd | 130/27 S |
| 4,253,472 | 3/1981 | Rayfield | 130/27 S |
| 4,312,365 | 1/1982 | Claas et al. | 130/27 P |

Primary Examiner—Jay N. Eskovitz
Attorney, Agent, or Firm—Michael J. Striker

[57] ABSTRACT

A selfl-propelled, vibration-free harvester has a threshing device including a threshing drum and a threshing basket associated therewith, a separating device located downstream of the threshing device as considered in a transportation direction and including a plurality of separating drums spaced from one another in the transportation direction and a plurality of separating elements associated with a respective ones of the separating drums, a supporting element arranged to support the separating elements, a wall, and mounting elements arranged to mount the supporting element on the wall and formed as a displacing device which positively lockingly lifts and lowers the supporting elements.

10 Claims, 4 Drawing Figures

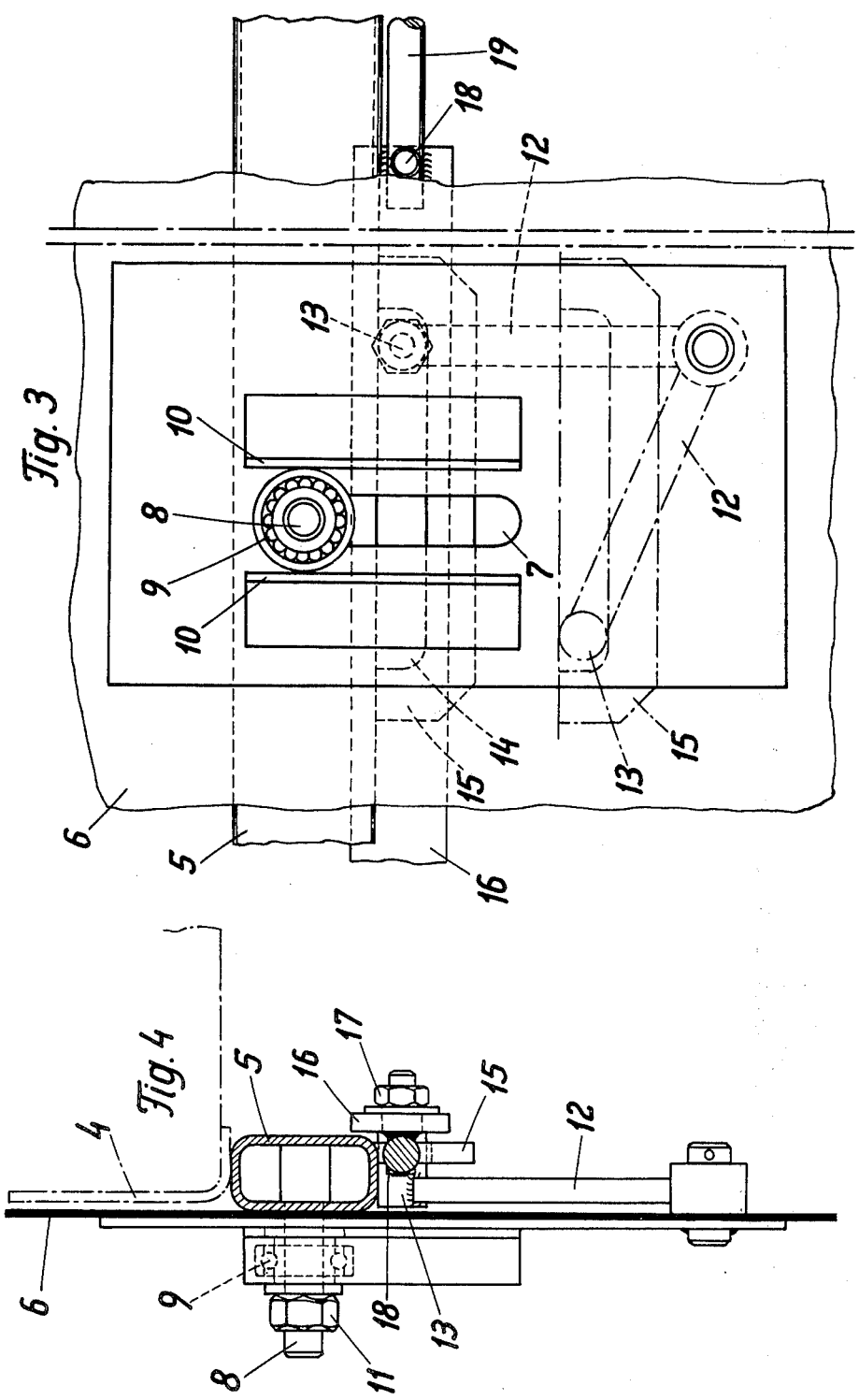

HARVESTER THRESHER

BACKGROUND OF THE INVENTION

The present invention relates to a vibration-free, self-propelled harvester thresher. More particularly, it relates to a harvester thresher which has threshing means including a threshing drum and a threshing basket, separating means located downstream of the threshing means as considered in the transportation direction and including a plurality of separating drums associated with separating elements, supporting elements each supporting one end of the separating elements of the separating means, and lifting means mounting the supporting elements in longitudinal openings of harvester thresher walls so that the supporting elements together with the separating elements supported thereon can be displaced upwardly and fixed in a plurality of upright positions.

The vertical displacement of the supporting elements is required to provide easy accessibility for example for elimination of clogging, on the one hand, and for fine residual grain separation, on the other hand. For the purpose of complete fine residual grain separation, the separation elements must be displaced more or less to the drums in dependence upon the weather conditions and the type of agricultural product to be treated. In other words, the supporting elements which support the separating elements must be adjusted. In order to attain this in a simple manner, the separating elements are adjusted in their height via longitudinally displaceable wedges which rest on track guiding parts. The lifting movement is performed forcefully, whereas the lowering of the supporting elements is performed by withdrawing the wedges so that the supporting elements with the separating elements thereon sink under the action of their weight. This can lead to disturbances, especially when wet agricultural products are to be treated, inasmuch as such an agricultural product deposits in the guides and the supporting elements cannot be lowered only under the action of their weight.

SUMMARY OF THE INVENTION

Accordingly, it is an object of the present invention to provide a self-propelled vibration-free harvester thresher which avoids the disadvantages of the prior art.

More particularly, it is an object of the present invention to provide a self-propelled vibration-free harvester thresher in which not only upward but also downward movement of the supporting elements and thereby the separating elements of the separating means is guaranteed even in bad conditions in fields.

In keeping with these objects, and with others which will become apparent hereinafter, one feature of the present invention resides, briefly stated, in a vibration-free self-propelled harvester thresher, in which mounting means which mount supporting elements of separating elements in elongated openings of lateral walls is formed as a displacing means which not only positively lockingly lift the supporting elements but also positively lockingly lower the supporting elements.

In accordance with another advantageous feature of the present invention, guiding members having an elongated slot are connected with each of the supporting elements, and pins arranged at one end of turntable levers extend into the elongated slot of a respective one of the guiding members.

For displacing or adjusting the levers, the pins of the levers of each supporting element are rotatably supported in a common adjusting or displacing bar.

Since the vertical position of both adjusting bars changes during the vertical adjustment, it is advantageous, in accordance with still another feature of the present invention, when each adjusting bar articulately engages a rod which is articulately connected with its free end with levers.

Still a further feature of the present invention provides for a simple construction and resides in the fact that the levers are connected with one another by a common axle, and this axle is fixedly connected with a further lever which, in turn, are connected with an adjusting device.

Still a further feature of the present invention is that the adjusting device includes a threaded spindle which can be actuated by a crank, and a threaded nut articulately connected with an adjusting lever and engaging with the threaded spindle.

It is advantageous when the threaded nut is provided with a pointer movable relative to a stationary scale.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is an enlarged view of a fragment of the inventive harvester thresher shown in FIG. 2; and FIG. 4 is a lateral view of the fragment of FIG. 3.

DESCRIPTION OF A PREFERRED EMBODIMENT

Figure 1:
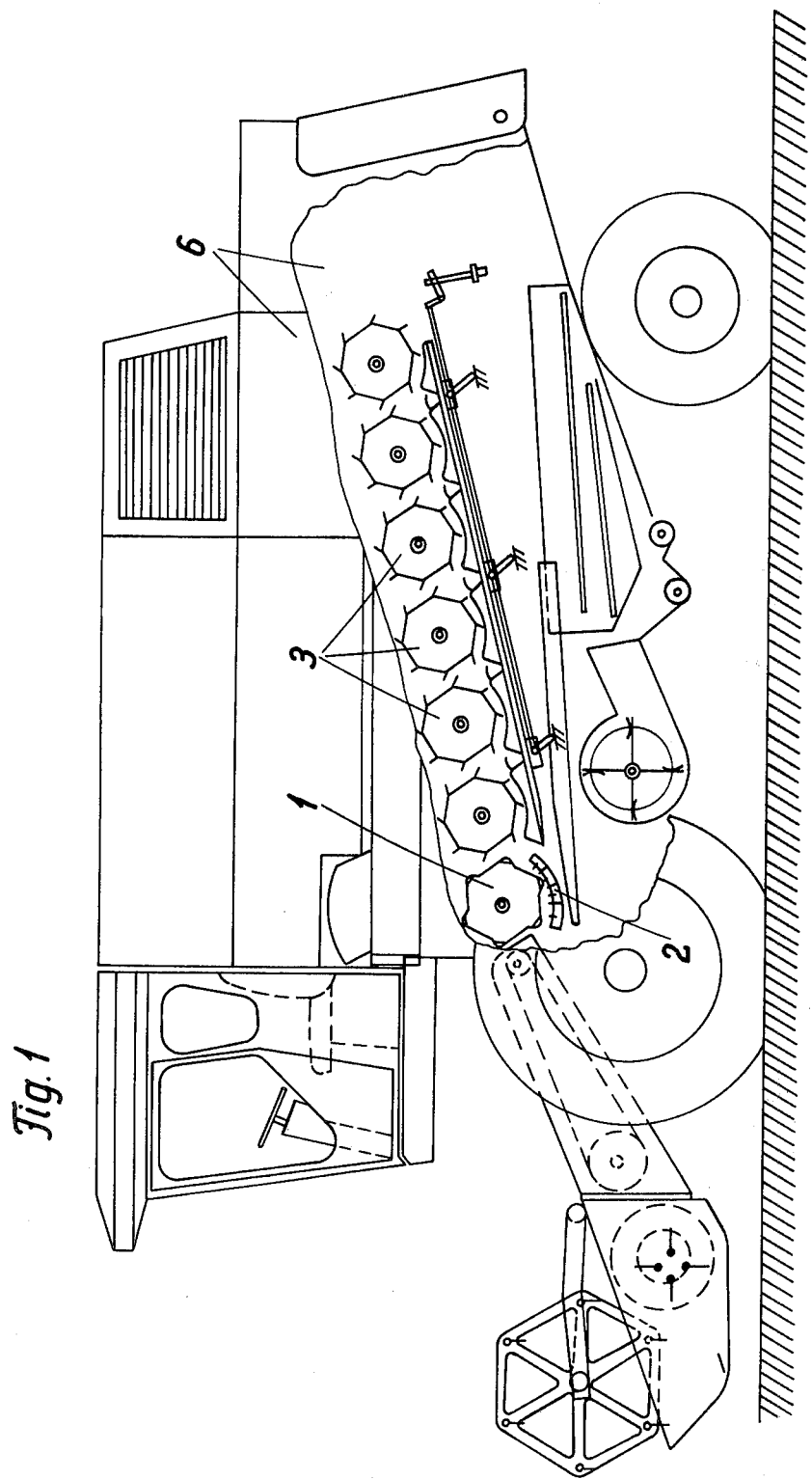
FIG. 1 is a lateral view of a self-propelled, vibration-free harvester thresher with a partially removed lateral wall, in accordance with the present invention.
Figure 2:
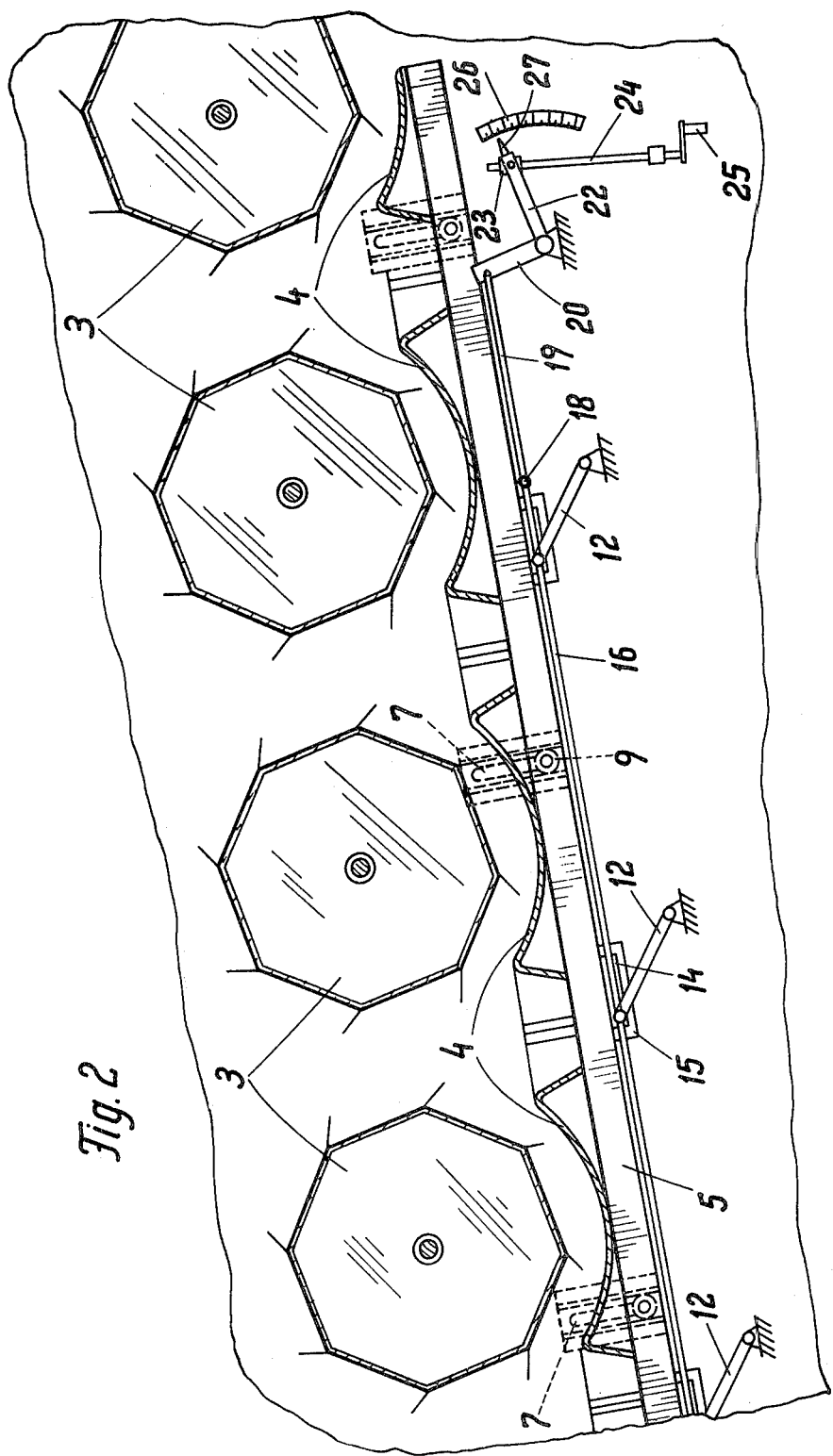
FIG. 2 is an enlarged view showing a part of separating means of FIG. 1.

A vibration-free, self-propelled harvester thresher in accordance with the present invention has threshing means which include a threshing drum identified by reference numeral 1 and a threshing basket identified by reference numeral 2. Separating means are located downstream of the threshing means as considered in a transportation direction and include a plurality of separating drums 3 and separating elements 4 each associated with a respective one of the separating drums.

The separating elements 4 of the separating means are supported on two elongated supporting elements 5 which extend substantially parallel to one another, and fixed thereto. For adjusting or displacing the separating elements 4 relative to the separating drum 3, the supporting elements 5 are arranged in an upright displaceable manner. More particularly, lateral walls 6 of the harvester thresher have elongated openings 7, and pins 8 which are welded to the supporting elements 5 extends through and outwardly beyond the elongated openings 7.

A ball bearing 9 is provided on the outwardly extending pin 8 and guided between two profiled members 10 extending substantially parallel to one another. For arresting the supporting elements in their selected vertical position, nuts 11 are arranged on the outwardly extending ends of the pins 8, so that the supporting elements 5 can be clamped relative to the lateral walls 6.

Lifting and lowering displacement of the supporting elements is performed by levers 12 which are pivotally mounted in the walls 6 of the harvester thresher. The other ends of the levers 12 are provided with pins 13 guided in longitudinal slots 14 of guiding members 15. The guiding members 15 are mounted at the lower side of the supporting elements 5. The length of the pins 13 is selected so that the pins 13 with their ends facing away from the levers 12 extend outwardly beyond the guide members 15.

Adjusting or displacing bars 16 are fitted onto the extending ends of the pins 13, and each adjusting bar 16 is provided for the pins of the left or the right supporting element of the harvester thresher. Both adjusting bars 16 are secured by nuts 17, and each adjusting bar 16 is connected via a pivot 18 with the end of a rod 19.

The other end of each rod 19 is pivotally connected with a lever 20. Both levers 20 are fixedly fitted on a common axle 21, and an adjusting lever 22 is welded to the axle 21. The free end of the adjusting lever 22 is rotatably connected with a threaded nut 23. The latter is arranged on a threaded spindle 24 and engages with the spindle. The threaded spindle 24 can be rotated by a handle or crank 25. The rotary speed of the crank 25 is thereby a measure for the adjustment of the supporting elements.

There are further provided a scale 26 which is stationary, and a pointer 27 which is mounted on the adjusting lever 22 and movable relative to the scale 26. The pointer 27 associated with the scale 26 shows an instantaneous position of the supporting elements and thereby the distance of the separating elements from the separating drums of the separating means.

It will be understood that each of the elements described above, or two or more together, may also find a useful application in other types of constructions differing from the types described above.

While the invention has been illustrated and described as embodied in a self-propelled vibration-free harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A harvester thresher, comprising threshing means including a threshing drum and a threshing basket associated therewith; separating means located downstream of said threshing means as considered in a transportation direction, and including a plurality of separating drums spaced from one another in the transportation direction and a plurality of separating elements each associated with a respective one of said separating drums and having two end portions spaced from one another in a transverse direction; supporting means arranged to support said separating elements of said separating means and including two elongated supporting elements extending in the transportation direction and spaced from one another in the transverse direction and each supporting a respective one of the portions of each of said separating elements of said supporting means; wall means including two lateral walls spaced from one another in the transverse direction and having elongated openings; mounting means arranged to mount each of said supporting elements in the elongated openings of a respective one of said lateral walls on said wall means so that said supporting elements together with said separating elements of said separating means are displaceable in an upright direction and fixable in a plurality of upright positions, said mounting means being formed as displacing means which positively lockingly lift and lower said supporting elements; and a plurality of guiding members connected with each of said supporting elements and each having an elongated slot extending in the transportation direction, said displacing means further including a plurality of turntable levers each having one end provided with a pin which extends into the elongated slot of a respective one of said guiding members.

2. A harvester thresher as defined in claim 1, wherein said separating elements of said separating means are formed as perforated trough-shaped bent sieve sheet members.

3. A harvester thresher as defined in claim 1, wherein said displacing means further includes two adjusting bars extending in the transportation direction and arranged so that the pins extending in the guiding members of each of said supporting elements are supported in a respective one of said adjusting bars.

4. A harvester thresher as defined in claim 3, wherein said displacing means further includes two rods and two further levers, each of said rods having one end articulately connected with a respective one of said adjusting bars and the other end articulately connected with a respective one of said further levers.

5. A harvester thresher as defined in claim 4, wherein said displacing means further includes a joint axle with which said two further levers are connected.

6. A harvester thresher as defined in claim 5, wherein said displacing means further includes an adjusting lever fixedly connected with said axle, and adjusting means being connected with said adjusting lever.

7. A harvester thresher as defined in claim 4, wherein said adjusting means includes a threaded nut articulately connected with said adjusting lever, and a rotatable threaded spindle engaging in said threaded nut.

8. A harvester thresher as defined in claim 5, wherein said displacing means further includes means for rotating said threaded spindle and formed as a crank.

9. A harvester thresher as defined in claim 7, and further comprising means for indicating a value of displacement of said supporting elements together with said separating elements of said separating means.

10. A harvester thresher as defined in claim 9, wherein said indicating means includes a stationary scale, and a pointer fixedly connected with said threaded nut and movable together with the latter relative to said stationary scale.

* * * * *